United States Patent
Kuhnert

(10) Patent No.: US 7,092,787 B2
(45) Date of Patent: Aug. 15, 2006

(54) SYSTEM AND METHOD FOR GENERATING A CONTROL PROGRAM

(75) Inventor: Wolfram Kuhnert, Röhrsdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/016,698

(22) Filed: Dec. 17, 2004

(65) Prior Publication Data

US 2005/0137726 A1    Jun. 23, 2005

(30) Foreign Application Priority Data

Dec. 22, 2003    (DE) ................................ 103 60 529

(51) Int. Cl.
*G06F 19/00* (2006.01)
(52) U.S. Cl. .................... 700/181; 700/90; 700/159
(58) Field of Classification Search ................. 700/83, 700/90, 95, 159, 181
See application file for complete search history.

(56) References Cited

U.S. PATENT DOCUMENTS

| | | | | |
|---|---|---|---|---|
| 3,502,882 A | * | 3/1970 | Von Voros ................. 250/202 |
| 3,614,372 A | * | 10/1971 | Dulebohn ................. 219/69.15 |
| 4,019,036 A | * | 4/1977 | Hiramatsu et al. .......... 700/133 |
| 4,104,976 A | * | 8/1978 | Landau et al. ......... 112/470.02 |
| 5,315,523 A | * | 5/1994 | Fujita et al. ................. 700/180 |
| 5,317,501 A | * | 5/1994 | Hilpert .......................... 700/3 |
| 5,343,391 A | * | 8/1994 | Mushabac ..................... 433/76 |
| 5,515,289 A | * | 5/1996 | Futamura et al. ........... 700/138 |
| 5,808,434 A | * | 9/1998 | Kokura et al. .............. 318/569 |
| 6,625,897 B1 | * | 9/2003 | Tadin ........................... 33/515 |
| 2005/0006019 A1 | * | 1/2005 | Ratcliffe ...................... 156/64 |
| 2005/0080503 A1 | * | 4/2005 | Kopelman et al. ............. 700/98 |

FOREIGN PATENT DOCUMENTS

DE    195 45 754 A1    6/1997
DE    198 29 661 A1    4/1999

* cited by examiner

*Primary Examiner*—Jayprakash N. Gandhi
(74) *Attorney, Agent, or Firm*—Henry M. Feiereisen

(57) ABSTRACT

A system for generating a control program for a machine includes an optical image acquisition device, in particular a scanner and a machine control system connected to the scanner. The machine control system includes an image processing module that associated image data read by the image acquisition device with contour data and additional image data, a code generator for automatically generating the control program based on the contour data, and a memory that stores the control program.

9 Claims, 2 Drawing Sheets

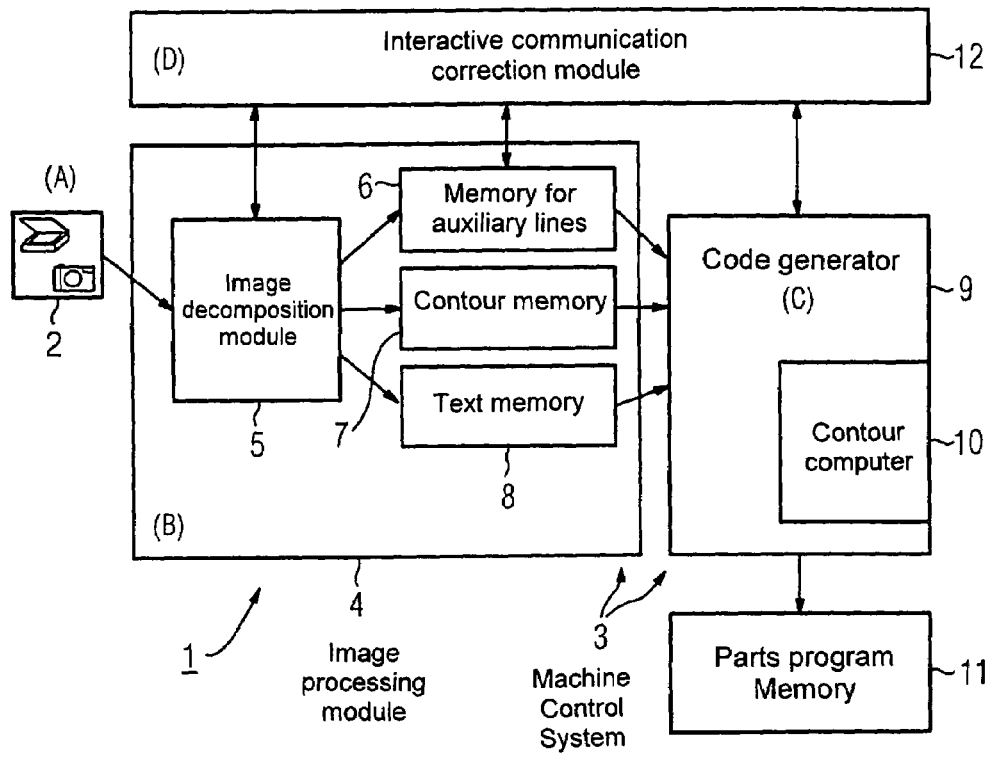
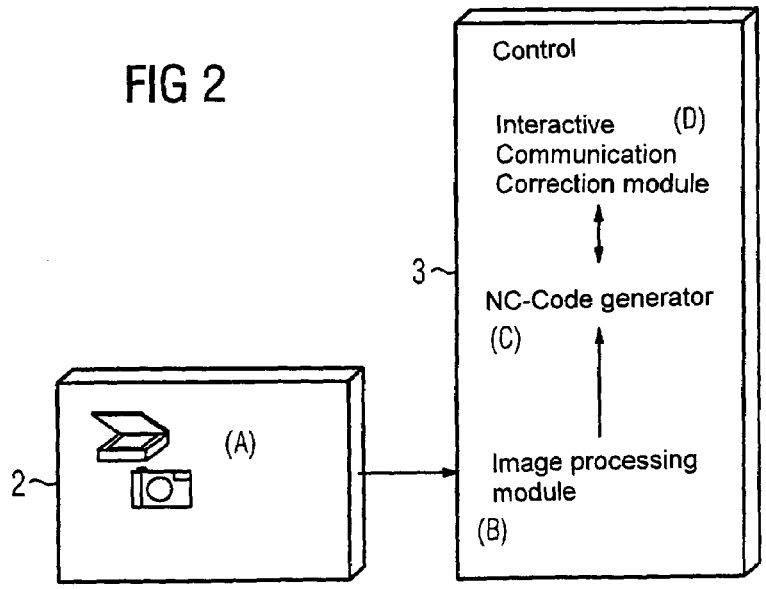

SYSTEM AND METHOD FOR GENERATING A CONTROL PROGRAM

CROSS-REFERENCES TO RELATED APPLICATIONS

This application claims the priority of German Patent Application, Serial No. 103 60 529.0, filed Dec. 22, 2003, pursuant to 35 U.S.C. 119(a)–(d).

BACKGROUND OF THE INVENTION

The present invention relates to a system and a method for generating a control program for a machine, in particular a machine tool or production machine.

Nothing in the following discussion of the state of the art is to be construed as an admission of prior art.

Machines, in particular machine tools or production machines, frequently include numerical controllers that can be connected with a computer-aided system for generating drawings, thereby facilitating the generation of data, in particular of data conforming to the industrial standard DIN 66025 or the corresponding international standard ISO 6983, which can be processed by the machine controller.

It would therefore be desirable and advantageous to provide a device and method for generating a control program for a machine, which obviates prior art shortcomings and is able to automatically generate a control program based on an existing technical drawing with a low occurrence of errors.

SUMMARY OF THE INVENTION

According to one aspect of the present invention, a system for automatically generating a control program for a machine from a drawing includes an optical image acquisition device that reads the drawing, and a machine control system connected to the image acquisition device. The machine control system further includes an image processing module that associates image data recorded by the image acquisition device with contour data and additional image data, a code generator that automatically generates the control program based on the contour data, and a memory that stores the control program.

According to another aspect of the invention, a method for generating a control program for a machine includes the steps of reading with the help of an optical image acquisition device a technical drawing into an image acquisition module that forms a part of a machine control system, associating the image data acquired with the image acquisition module with contour data and additional data, and automatically generating from the contour data a control program capable of controlling the machine.

Advantageous embodiments of the invention may include one or more also following features. The image acquisition device can include a scanner or a digital camera. The code generator can advantageously include a contour computer which allows, for example, the automatic correction of double-lines and the interpolation of contour transitions. In this way, the Cartesian coordinates of points of intersection can be computed particularly in situations where the point of intersection between two elements is unknown. Other contours that are feasible and useful based on the configuration of the machine can also be sorted automatically in order to separate interior contours from exterior contours. The code generator can also determine appropriate machining techniques, for example undercutting or thread-cutting, that can be used to generate the desired contour of the workpiece to be machined.

According to an advantageous feature of the invention, an interactive correction module can be used in conjunction with the code generator and the image processing module. This enables the user or operator to add missing contour sections and/or to select in the event of ambiguities a certain defined contour or a contour transition from several automatically generated proposed contours. The correction module can also facilitate the input of additional data into the machine control system, for example data relating to the employed tools.

According to another advantageous feature of the invention, the machine control system can generate, based on a printed technical drawing, a control program that describes contours which are exclusively composed of arcuate segments and straight segments. In principle, the machine control system is also capable of describing arbitrary three-dimensional shapes, if the machine is capable of and used to performing such machining operations.

According to another advantageous feature of the invention, the operator of a machine can read directly at the location of the machine a drawing available in printed form directly into the machine controller without an intermediate computer system, whereby the machine controller thereafter automatically generates a part control program from the captured digitized data.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a system for generating a control program for a machine according to the invention;

FIG. 2 is a schematic diagram of the method for generating the control program according to FIG. 1.

DETAILED DESCRIPTION OF PREFERRED EMBODIMENTS

Figure 3:
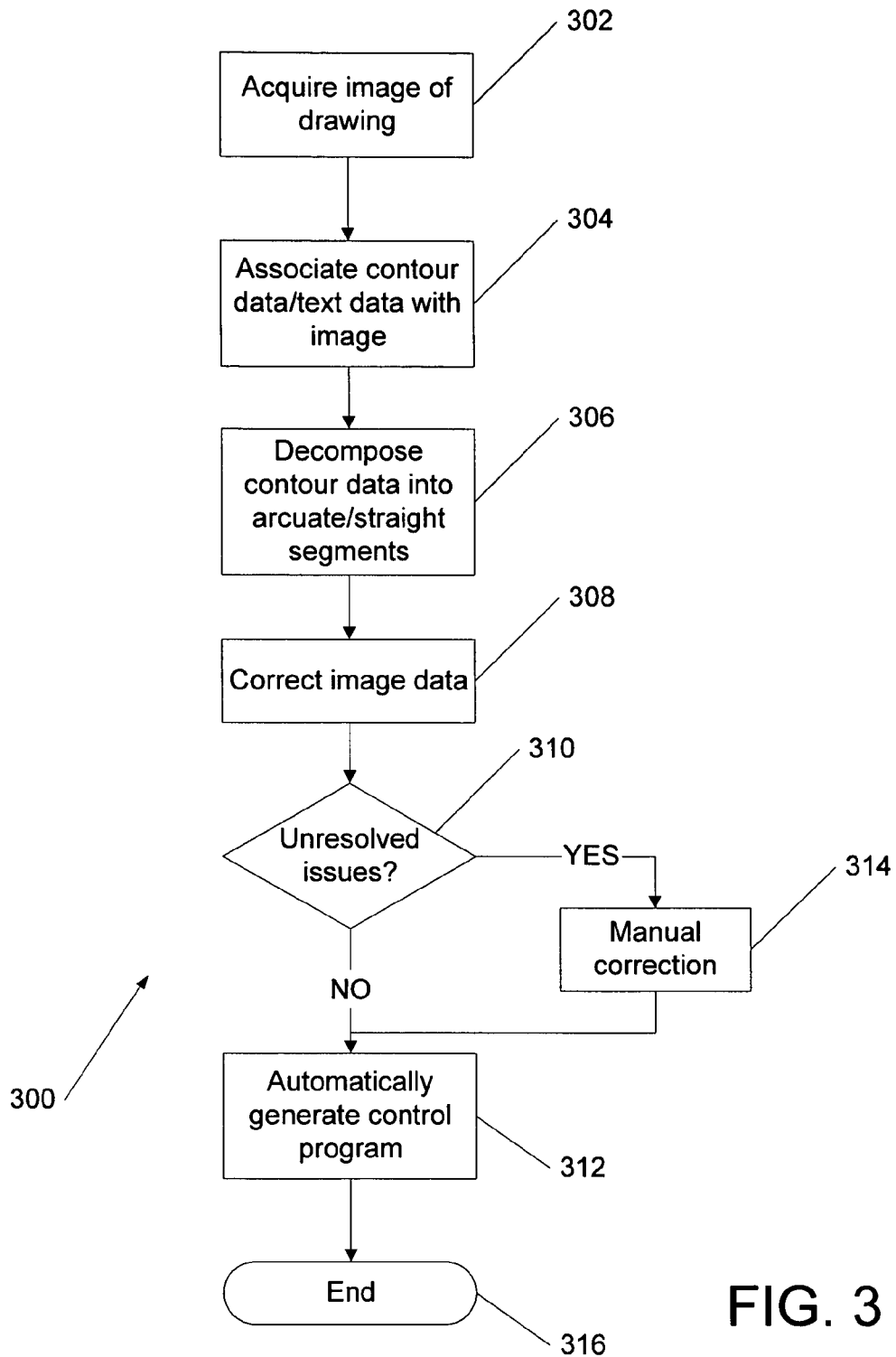
FIG. 3 is a schematic process flow of the method for generating the control program according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a system 1 for generating a control program for a machine tool or production machine, which includes an image acquisition device 2 and a machine control system 3 having a plurality of components. FIG. 2 is a schematic diagram of the method that can be performed with the system 1, with the machine control 3 being depicted in FIG. 2 as a functional module. The discussion below refers to, unless noted otherwise, to both figures.

The machine control system 3, which is configured similar to a conventional machine controller, is located at or in close proximity to the machine tool (not shown), for which a control program is to be generated based on an existing printed drawing. The technical drawing is read by the image acquisition device 2, which can be a conventional scanner, a digital camera and/or another type of optical image acquisition device located in close proximity of the machine control system 3, i.e., in the workspace of the operator of the controlled machine, into an image processing module 4 that is part of the machine control system 3.

The image processing module 4 includes an image decomposition module 5 as well as a memory 6 for auxiliary lines, a contour memory 7 and a text memory 8. The image decomposition module 5 associates the acquired image data of the technical drawing, on one hand, with contour data and, on the other hand, with other data provided in the corresponding memories 6, 7, and 8. The textual information contained in the drawing can include, for example, measurement values and other technical information, i.e., information about the machining processes. The image processing module 4 can automatically eliminate information in the drawing that is not required for machining the workpiece. The contours of the workpiece to be machined according to the scanned drawing are initially stored in the contour memory 7 without further processing.

A code generator 9, which represents another part of the machine control system 3 and includes a contour computer 10, is connected downstream of the image processing module 4. The contour computer 10 converts the contour data extracted in image processing module 4 from the data in the drawing into defined geometric shapes, which are exclusively straight segments or arcuate segments. The contour computer 10 is capable of identifying double-lines and replacing the double-lines by an unambiguous contour. The contour computer 10 is also capable of correcting, for example, contour transitions that are not clearly indicated in the drawing. The automatically corrected contours are then converted by the code generator 9 into a control program that can be executed by the machine tool, whereby the control program is stored in a memory 11, also referred to as parts program memory that forms another part of the machine control system 3. The memory 11 can store a plurality of the different control programs generated from the drawing read by the image acquisition device 2. Memory 11 also associates with the corresponding workpieces information that has been automatically obtained from the scanned drawing and relates to the type of machining process.

The system 1 further includes a correction module 12 that can be interactively operated and communicates with the image processing module 4 and the code generator 9. The individual components 2 to 12 of the system 1 can be combined into various configurations with different units. The separation into individual components as depicted in FIG. 1 represents only examples for illustrating the underlying functional principles of the system 1. The correction module 12, which can includes an input device (not shown), in particular a keyboard, as well as the output device (not shown), such as a display screen, or at least connections for such input and output modules, enables the user, i.e., the operator of the machine tool or production machine, to access the machine control system 3. In this way, contour transitions can be defined by the operator that cannot be uniquely determined based on the drawing read by the afore-described automatic processes. In addition, the correction module 12 can make changes or additions to the automatically generated control program.

FIG. 3 shows a process flow diagram for the method according to the invention for generating a control program for a machine. The process 300 begins at step 302 by acquiring an image of the technical drawing and then associating image data with contour data and other data, such as text data, step 304. The associated contour data are then decomposed into arcuate and straight segments, step 306, with artifacts in the image data corrected by correcting features or adding features, step 308. The process 300 then checks for any issues that cannot be automatically resolved, step 310. If there are no remaining issues or ambiguities, then the process 300 goes to step 312 to automatically generate the control program for the machine, otherwise the remaining issues are resolved manually, for example, through intervention by an operator, step 314, whereafter goes to step 312 to generate the control program for the machine. The process 300 ends at step 316.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A system for automatically generating a control program for a machine from a drawing, comprising:
   an optical image acquisition device reading the drawing;
   a machine control system connected to the image acquisition device and comprising
      an image processing module that associates image data recorded by the image acquisition device with contour data and additional image data;
      a code generator that automatically generates the control program based on the contour data;
      an interactively controllable correction module that cooperates with the image processing module and the code generator; and
      a memory that stores the control program,
   wherein the correction module automatically proposes several contours or contour transitions for an ambiguous contour segment and allows interactive selection of one of the contours or contour transitions or addition of a missing contour or contour transition.

2. The system of claim 1, wherein the image acquisition device comprises at least one of a scanner and a digital camera.

3. The system of claim 1, wherein the code generator comprises a contour computer capable of automatically correcting ambiguous features in the drawing.

4. The system of claim 3, wherein the ambiguous features are selected from the group consisting of double-lines, missing contour lines, and imprecise contour transitions.

5. The system of claim 1, wherein the additional image data read by the image acquisition device include auxiliary lines.

6. The system of claim 1, wherein the additional image data read by the image acquisition device include textual data.

7. The system of claim 1, wherein the correction module receives additional data relating to a tool used for machining a workpiece with the control program.

8. A method for generating a control program for a machine, comprising the steps of:
- with an optical image acquisition device, reading a technical drawing into an image acquisition module that forms a part of a machine control system;
- associating the image data acquired with the image acquisition module with contour data and additional data;
- with an interactive correction module, automatically proposing several contours or contour transitions for an ambiguous contour segment and allows interactive selection of one of the contours or contour transitions or addition of a missing contour or contour transition; and
- automatically generating from the contour data a control program capable of controlling the machine.

9. The method of claim 8, wherein exclusively arcuate segments and straight sections are generated from the contour data.